United States Patent
Papritz

[15] 3,685,779
[45] Aug. 22, 1972

[54] DEVICE FOR COMPENSATION OF A FORCE OF CONSTANT VALUE AND DIRECTION

[72] Inventor: Hans Papritz, Liebefeld, Switzerland

[73] Assignee: Haag Streit AG, Liebefeld, Switzerland

[22] Filed: June 4, 1968

[21] Appl. No.: 734,448

[52] U.S. Cl. ............... 248/399, 248/162, 248/407, 108/146
[51] Int. Cl. ............................................. A47b 9/00
[58] Field of Search ............. 248/399, 401, 162, 372; 108/146; 267/74, 166

[56] References Cited

UNITED STATES PATENTS

| | | | |
|---|---|---|---|
| 2,536,572 | 1/1951 | Sather | 248/399 |
| 3,085,778 | 4/1963 | Korn | 248/399 |
| 3,096,059 | 7/1963 | Johnson | 248/162 |
| 3,179,364 | 4/1965 | Jackson et al. | 248/162 |
| 3,213,809 | 10/1965 | Kritske | 108/146 |

FOREIGN PATENTS OR APPLICATIONS

| | | | |
|---|---|---|---|
| 658,064 | 10/1951 | Great Britain | 248/399 |
| 1,366,797 | 6/1964 | France | 297/345 |
| 936,249 | 12/1955 | Germany | 248/399 |
| 1,104,245 | 4/1961 | Germany | 248/401 |

Primary Examiner—Marion Parsons, Jr.
Attorney—Imirie & Smiley

[57] ABSTRACT

This invention relates to a device for compensation of a force of constant value and direction, for instance the weight of a vertically adjustable instrument table, wherein the anchoring points of compensating springs are so guided along circular paths that the force is fully compensated for various positions of the compensating device.

10 Claims, 10 Drawing Figures

DEVICE FOR COMPENSATION OF A FORCE OF CONSTANT VALUE AND DIRECTION

This invention relates to a device for compensation of a force of constant value and direction, for instance a weight of a vertically adjustable carrier such as an instrument table. It is an object of this invention to provide a simple compensation by means of springs with limited space requirements and able to fully compensate the weight of an element independently of its position within a relatively wide range. It is another object of this invention to allow simple adjustment of the compensating device to various forces to be compensated.

In view of these and other objects the device according to this invention broadly comprises at least one compensating spring attached with its ends to anchoring members of which one is guided along a circular path relatively to the other anchoring member, the center of said circular path and the said other anchoring member being located on a line parallel to the direction of the force to be compensated. It may be shown that under these circumstances the above conditions may be satisfied, whereby it is sufficient to shift the said other anchoring member relatively to the center of the circular path in the direction of the force for adapting the device for compensation of various forces.

Figure 1:
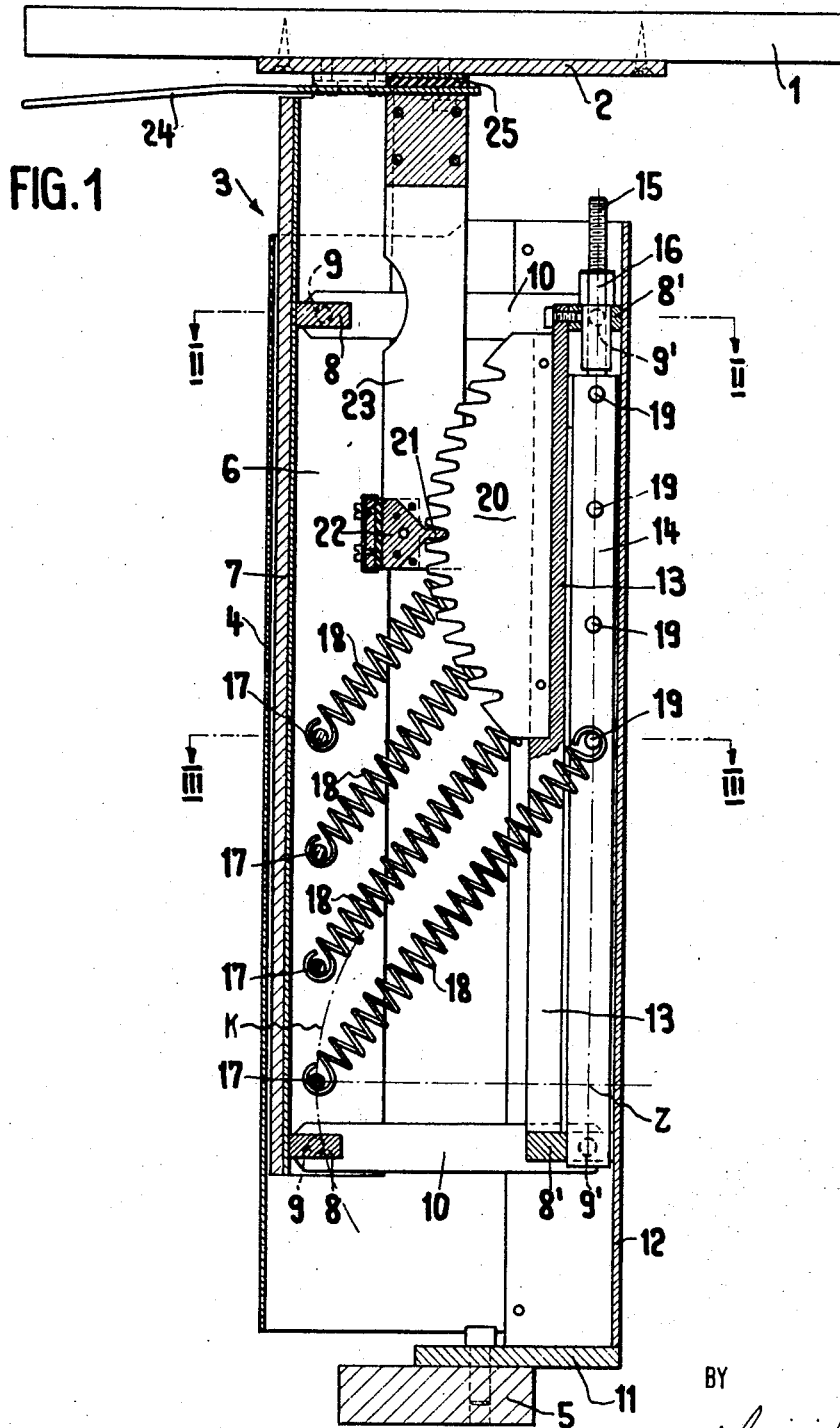
Figure 2:
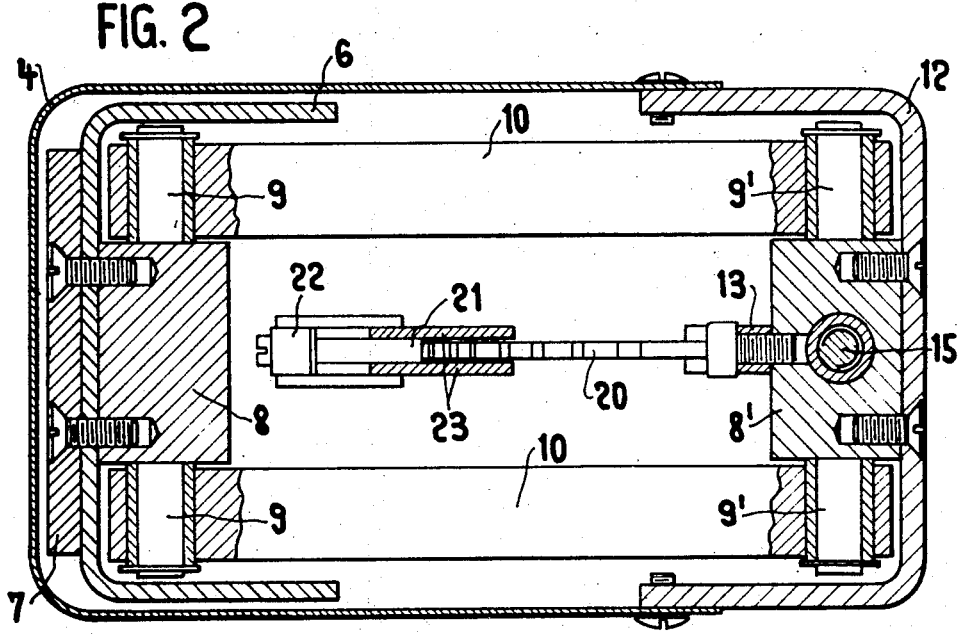
Figure 3:
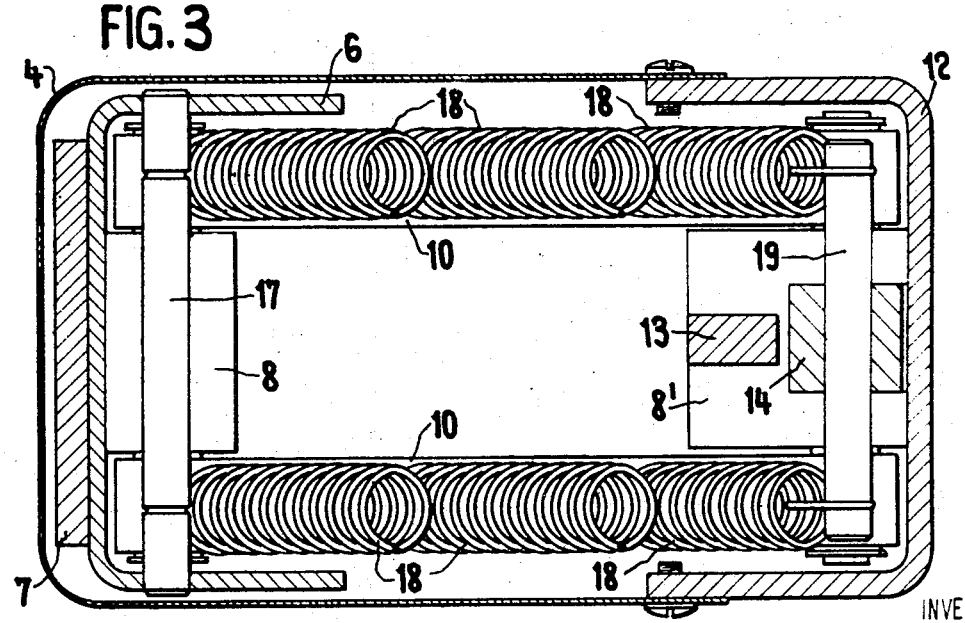
Figure 4:
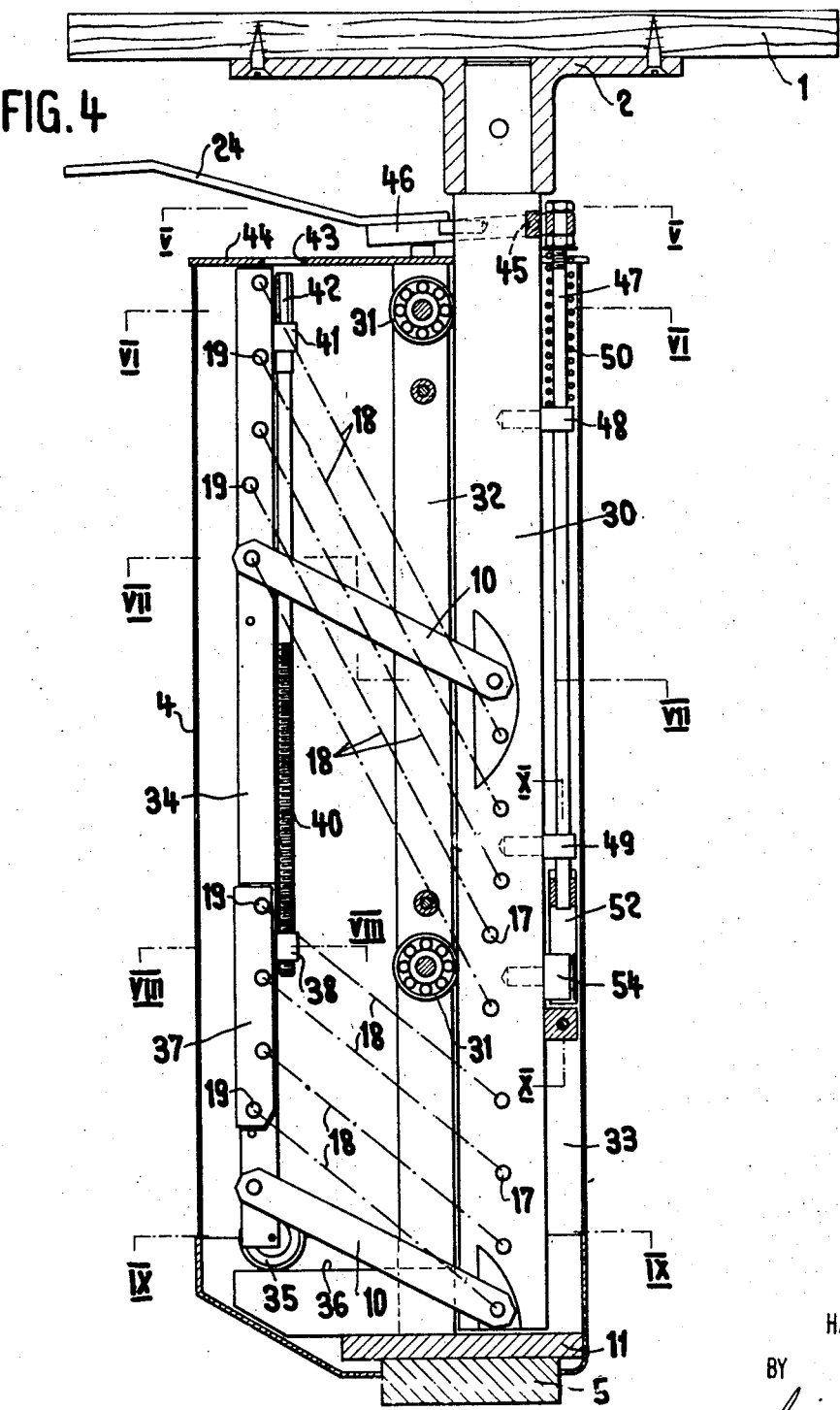
Figure 5:
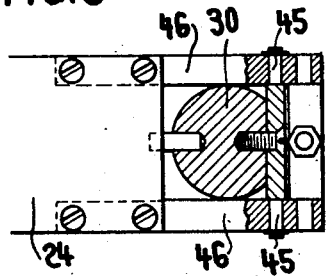
Figure 6:
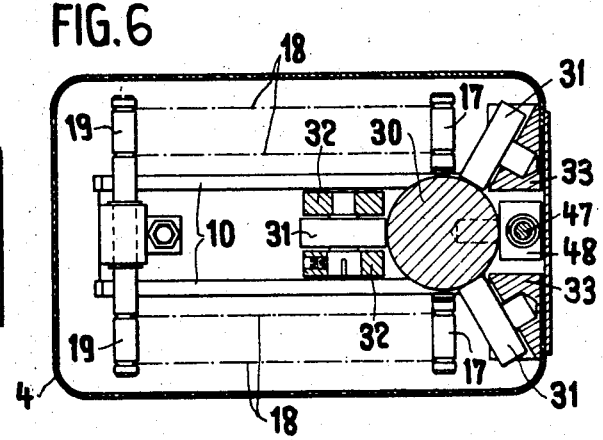
Figure 8:
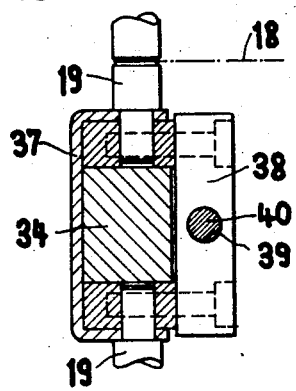
Figure 7:
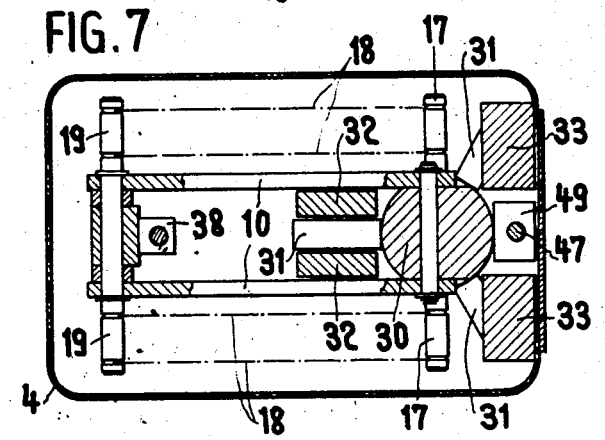
Figure 10:
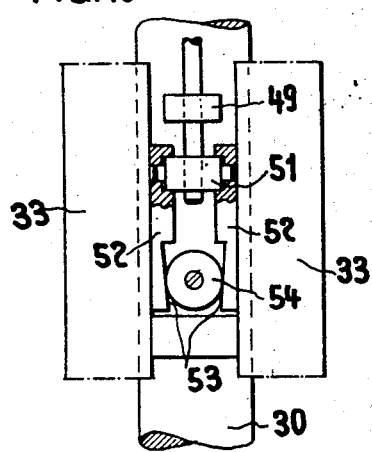
Figure 9:
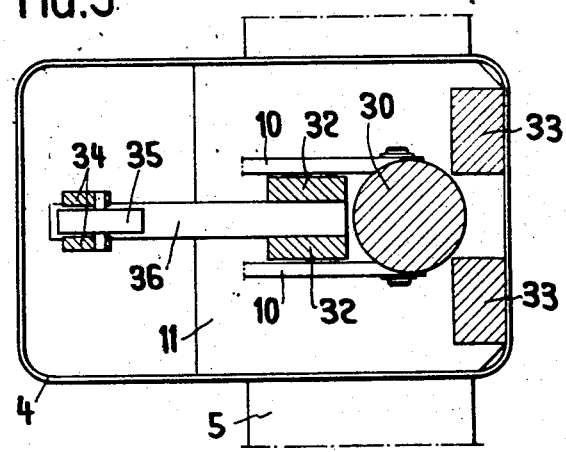

The invention will now be explained in detail with reference to two embodiments illustrated in the accompanying drawing wherein FIG. 1 is a vertical section of the first embodiment, FIGS. 2 and 3 are horizontal sections along lines II—II and III—III respectively in FIG. 1, FIG. 4 is a vertical section of the second embodiment and FIGS. 5 to 10 are sections along lines V—V to X—X in FIG. 4.

The first embodiment shown in FIGS. 1–3 has a table 1 carrying an instrument not shown in the drawing and which is displaceable with the table 1 in vertical direction. The table 1 is screwed to a plate 2 fixed at the upper end of a vertical support 3. This support 3 is movable in a casing 4 which may be fixed to the ground by means of its base 5. The support 3 is made of a U-profile 6 reinforced by a flat iron 7. Laterally projecting pivot pins 9 are screw-fixed in blocks 8 connected to parts 6 and 7 in two places. Crank arms 10 are pivoted on said pivot pins 9. Pivot pins 9' for arms 10, similar to pivot pins 9 are screw-fixed in blocks 8' similar to blocks 8, blocks 8' being fixed in a U-profile 12 supported on the base 5 by means of a plate 11 and constituting a portion of the stationary casing of the device. The support 3 and arms 10 form a parallel crank mechanism so that support 3 may be displaced in a translatory movement along a circular path round the stationary pivot pins 9'. A column 14 is vertically displaceable in a guide canal formed between the U-profile 12 and a rail 13. An actuating spindle 15 extending through a nut 16 resting on the upper block 8' is fixed to the upper end of column 14. The nut 16 may be turned by means of a key inserted through the upper opening of the casing in order to displace the spindle 15 and column 14 in vertical direction.

The lower portion of the U-profile 6 of support 3 has pins 17. As shown in FIG. 3 two coil springs 18 are anchored on each of said pins 17. The upper ends of coil springs 18 are anchored on similar pins 19 of column 14. For the sake of a clear illustration the upper end connected to column 14 of the lowermost spring 18 is shown in FIG. 1 although in fact the upper end of this spring would not be visible in this sectional view.

The nose 21 of a locking element 22 connected to both legs 23 of a vertical lever arm engages a toothed segment 20 fixed to the rail 13. The lever arm 23 is connected to a lever arm 24 disposed in a position substantially parallel to the table 1 below the latter. The inner flat portion of the lever arm 24 is movably fixed to the plate 2 by means of a screw, an elastical pad 25 of rubber or the like being clamped between the lever arm and plate 2. Usually the lever arms 23 and 24 are maintained in the position illustrated in FIG. 1 by the elasticity of the pad 25, whereby the nose 21 engages the toothed segment 20 and thus determines the vertical position of table 1 and support 3 connected thereto. However, the actuating arm 24 of the locking lever may be lifted in order to disengage the nose from the toothing of segment 20 and to adjust the vertical position of the table 1 and support 3, the pad 25 being thereby slightly compressed at its left side.

Upon vertical displacement of the table 1 and support 3 the anchoring points 17 of springs 18 are moved along circular paths, the path K of the lowermost anchoring point 17 being indicated in mixed lines. The other anchoring point 19 of each spring 18 is located on a vertical line through the center Z round which the associated anchoring point 17 is displaced. This vertical line through anchoring points 19 and center Z is parallel to the force to be compensated; that is the weight of support 3, table 1 and the instrument placed thereon. As mentioned above, it may be shown in a relatively simple manner that under these circumstances full compensation of the weight is obtained for any position of the table provided that the springs 18 operate in the linear portion of their characteristic, that is, their spring force is proportional to the elongation of the spring. Theoretically possible errors due to slightly alinear spring characteristics are without practical importance. For adapting the compensating device to a determined weight it is sufficient to displace spindle 15 and column 14 by rotation of nut 16 until full compensation of the weight is obtained.

With the embodiment of FIGS. 1 to 3 the desired vertical displacement of table 1 is always accompanied by a minimum movement in horizontal direction due to the circular translatory movement of the support 3 and table 1. The effect may be avoided with the second embodiment illustrated in FIGS. 4 to 10, wherein corresponding parts are designated with similar reference numerals as in FIGS. 1 to 3. The table 1 and plate 2 are connected to a support 30 vertically guided in two places by means of groups of three ball bearings 31. The ball bearings 31 are mounted on three vertical supports 32 and 33. Support 30 is coupled with a column 34 by means of two pairs of crank arms 10. The lower end of column 34 is supported on a horizontal guide rail 36 by means of a ball bearing 35. Guide rail 36 is connected to plate 11 and base 5 respectively. A bracket 37 is mounted on the lower portion of column 34 and may be shifted therealong in vertical direction. A block 38 serving for anchoring the bracket 37 on the column 34 has a screw-threaded bore 39 receiving a spindle 40. The upper end of the spindle 40 is pivoted but axially secured in a block 41 fixed to the upper end of column 34. The upper polygonal end 42 of spindle 40 serves for applying a key inserted through an opening 43 of the casing cover 44.

The support 30, the column 34 and the bracket 37 have anchoring bolts 17 and 19 for pairs of compensating springs 18, these springs being only indicated by mixed lines in FIGS. 4–10. The upper system of compensating springs 18 has five groups of four springs disposed in a common plane. These springs of the upper group may be arranged with a somewhat smaller inclination when the right-hand ends of the uppermost springs would be anchored at the right-hand pivot pin of the upper crank arm 10 and when the right-hand ends of the remaining springs would be anchored each by one place higher. Another spare anchoring bolt may be provided on the column 34 so that an additional group of springs may be inserted in order to compensate a higher weight.

A brake for locking the table 1 at a desired level is mounted on the support 1. An actuating arm 24 similar to the one shown in FIGS. 1 to 3 is assembled with a fork 46 pivotably mounted on a pin 45 and connected to an actuating rod 47 guided for vertical movement in blocks 48 and 49 screwed to the support 30. A pressure spring 50 normally maintains the rod 47 in the illustrated upper end position. The lower end of rod 47 is connected to a block 51 carrying two movable braking shoes 52 with wedging surfaces 53. When the actuating rod 47 is in its upper end position determined by spring 50 the wedging surfaces 53 are applied against the bolt 54 whereby the braking shoes are urged against the rails 33 and the table is locked at a predetermined level.

By lifting the actuating arm 24 the rod 47 may be pushed downwardly against the pressure of spring 50, whereby the braking shoes are also shifted downwardly and their wedging surfaces are disengaged from the bolt 54 so that the brake becomes inefficient. The table 1 may now be adjusted downwardly or upwardly whereby the braking shoes 52 freely slide between rails 33. During adjustment of the table full compensation of the weight occurs because the anchoring point of each compensating spring moves along a circular path relatively to the other anchoring point, whereby the horizontal component of the circular movement is transmitted to the column 34 which is horizontally displaced with the ball bearing 35 rolling along the guide rail 36 and supporting the full weight. For continuously adapting the compensating mechanism to changes of the total weight to be compensated the bracket 37 may be vertically shifted by means of spindle 40 in order to change the tension of the lower group of compensation springs. For adaption of the mechanism to substantial changes of the weight to be compensated, groups of springs may be added and/or the inclination of some springs or all springs may be changed as mentioned above.

Details of both embodiments illustrated in the drawing may be changed. Further, elements of one embodiment may be used in the other embodiment. As an example, spare anchoring elements may also be provided in the embodiment of FIGS. 1 to 3 so that the springs may be disposed with various inclination or additional groups of springs may be applied. Also in the first embodiment only a limited number of springs may be suspended on a displaceable part corresponding to bracket 37 for fine adjustment of the compensating action. Of course, the invention is not limited to the compensation of the weight of an instrument table. The illustrated embodiments are advantageous by the fact that due to the use of a number of relatively short springs the cross section of the column-shaped casing is relatively small. However, when more space is available, compensation may be erected with one single spring, whereby a pressure spring may also be used acting upwardly onto the part to be compensated. Other types of springs than the coil springs shown in the embodiments may be used as far as their stroke within the linear range is sufficient. It has been assumed for both embodiments that the springs are directly attached to the part to be compensated. However, it is also feasible to provide a mechanical transmission between the part to be compensated and the compensating mechanism, whereby the compensating force may be increased or reduced and/or reversed into an other direction, in order to obtain a more favorable construction and disposition of the compensating mechanism. The circular movement of one anchoring point of each spring may be effected in another manner than as illustrated and described. As an example, a guide roller may be provided which is moved along a circular guideway.

What I claim is:

1. A device for compensation of a weight, comprising a displaceable vertical support having a carrier for said weight, a stationary vertical column and crank arms interconnecting said support and column to form a crank parallelogram, said support being swingable in a translatory rotating movement relatively to said column, at least one compensating spring in inclined position and attached with its ends to said support and column respectively for compensation of the weight on said carrier, a toothed segment fixed on said column and locking means engageable with said toothed segment attached to said support for locking said support, carrier and weight in any desired position relatively to said column.

2. A device according to claim 1 for an instrument table, comprising a table board fixed on said support and an actuating arm of the said locking means displaceable with the table board and support respectively, said actuating arm being adapted to be seized together with said table board.

3. A device according to claim 2, comprising a column-shaped casing wherein a plurality of compensating springs are accommodated, said actuating arm being disposed between the top of said casing and the table board.

4. A device according to claim 3, wherein the said locking means are disposed in the middle of compensating said casing between two lateral groups of springs.

5. A device for compensating a force, comprising guide means wherein a first structure is guided for vertical displacement in the direction of said force, a second structure guided for displacement in a direction perpendicular to said force and displacing direction of the first structure respectively, crank levers interconnecting said first and second structure to form a crank parallelogram, said second structure being shifted in said direction perpendicular to said force by said crank levers upon displacement of said first structure, at least one anchoring member on each of said first and second structures and at least one compensating spring disposed between said first and second structure and attached with its ends to said anchoring members.

6. A device according to claim 5, wherein said second structure is a column supported on and displaceable along a horizontal guide rail.

7. A device according to claim 6, comprising a group of compensating springs attached to a bracket mounted for vertical adjustment on said column.

8. A device according to claim 7, comprising spare anchoring members for compensating springs on said structures, so that the number of compensating springs may be changed and the inclination of a group of springs may be changed for coarse adjustment of the compensating force.

9. A device according to claim 5, comprising a locking mechanism mounted on said support, said locking mechanism including a brake having braking members applicable against stationary rails.

10. A device for compensation of a force of constant value and direction by spring action comprising a first structure displaceable by said force and a second structure not displaceable in the direction of said force, compensating spring means having one end thereof connected to a first anchoring member on one of said structures and having the opposite end thereof connected to a second anchoring member on the other of said structures, guiding means for guiding said one structure such that said first anchoring member is guided for movement along a circular path about a center point, said center point and said second anchoring member being disposed on a line extending parallel with the direction of the force to be compensated, whereby said compensating spring means fully compensates said force at all times during operation of the device, said structures and guiding means comprising a vertical support coupled with a vertical column by means of crank arms, said support, column and crank arms forming a crank parallelogram, anchoring members on each of said support and said column, a plurality of springs being disposed in inclined position between and attached with their ends to anchoring members of said support and column respectively, at least a portion of said column being adjustable in vertical direction for adjusting the compensating effect of a group of springs attached thereto.

* * * * *

UNITED STATES PATENT OFFICE
CERTIFICATE OF CORRECTION

Patent No. 3,685,779                     Dated August 22, 1972

Inventor(s)         HANS PAPRITZ

It is certified that error appears in the above-identified patent and that said Letters Patent are hereby corrected as shown below:

Claim 4, lines 2-3, delete "compensating"

line 3, after "of" insert -- compensating --;

Signed and sealed this 6th day of February 1973.

(SEAL)
Attest:

EDWARD M. FLETCHER, JR.           ROBERT GOTTSCHALK
Attesting Officer                   Commissioner of Patents